Patented Feb. 16, 1954

2,669,510

UNITED STATES PATENT OFFICE 2,669,510

FERTILIZER CONDITIONER

Harry A. Dresser, Chicago, Ill., assignor to Zonolite Company, Chicago, Ill., a corporation of Montana No Drawing. Application April 6, 1953, Serial No. 347,173

8 Claims. (Cl. 71—64)

This invention relates to fertilizer compositions and is particularly directed to anti-caking fertilizers and methods of producing the same.

The present application is, in part, a continuation of my copending application Serial No. 188,281, filed October 3, 1950, and, in part, a continuation of my copending application Serial No. 275,245, filed March 6, 1952, both now abandoned.

Commercial fertilizers contain at least one of three main chemicals and may also contain minor quantities of others. The primary components of such fertilizers are nitrogen, commonly in the form of ammonium sulfate or ammonium nitrate or other salts high in nitrogen, phosphoric acid in the form of phosphate of one type or another, and potash in the form of potassium salts. These constituents are mechanically mixed to provide a uniform product and the composition checked and regulated as required, to provide such well known compositions as "5–10–5," "4–12–4" and the like. In such formula identifications, the figures between hyphens refer to the percentages of available nitrogen, $P_2O_5$, and $K_2O$, in that order.

One of the serious problems which prevails in the fertilizer industry arises from the hygroscopic nature of such fertilizer compositions and results in the hardening and/or caking of such products, which may occur at any time after the fertilizer components are mixed. If such caking occurs before the fertilizer is bagged, it is necessary to mill the product. If it occurs after bagging the consumer is faced with the problem of disintegrating such hardened mixture. This condition is aggravated by the seasonal character of fertilizer demands, which fact requires that the fertilizer mixtures be made up in advance, which in turn means that the fertilizers, having been made up, are subject to caking.

In attempting to solve or minimize this problem fertilizer compositions are mixed with materials, known as conditioners, such as tobacco stems, coco shells, peanut hull bran, furfural residue, dried sludge, bar. corn, ground corn cobs, cork dust, sawdust, tung oil meal, and spent fuller's earth. While such materials do have some beneficial effect in minimizing the caking tendency of such commercial fertilizers, they are not entirely suitable for a variety of reasons. For example the organic materials which are in common use are potential carriers of plant diseases. They must be sterilized before use to avoid such possible contamination, which involves an expensive and time consuming operation. In using some of the other conditioners such as rice hulls, tobacco stems, or peanut hull bran or humus, it is necessary to use from 50 to 200 lbs. With a trend toward higher analysis fertilizers it makes it difficult to formulate high analysis grades of fertilizer when 200 lbs. out of a ton of fertilizer are made up of inert materials. Other suggested materials are of such a nature that they present a fire hazard, or may deteriorate in storage.

The present invention is based on the fact that, certain forms of vermiculite have been found to be admirably suited for fertilizer conditioning, and that such composite fertilizers in accordance with the present invention are non-caking, sterile, free of fire hazard, inexpensive and easy to use. For this purpose I have found that the use of up to about 30 lbs. of exfoliated vermiculite in admixture with one ton of fertilizer not only maintains the fertilizer in a free flowing condition, but furthermore, improves the nutrient character of the composition.

The preferred form of vermiculite for use in my invention is exfoliated vermiculite, having a mesh of up to about minus ⅛ inch. Larger size vermiculite may be used. However, if the particles are too large there is danger of segregation. Smaller size particles have proven successful.

I have found that the use of up to about 30 lbs. of exfoliated vermiculite per ton of fertilizer, that is, up to about 1.5%, is at least as beneficial considering only the anti-caking properties imparted thereto, as for example up to about 200 lbs. of materials such as rice hulls, peanut hulls, tobacco stems and the like. Besides serving as an anti-caking material for such commercial fertilizers, the exfoliated vermiculite component thereof may be considered as an active ingredient of such fertilizer, in that, it adds magnesium, in acid soluble form, thereto. The importance of magnesium of course is that it is an essential component of chlorophyll, and additionally seems to be essential to the proper use of phosphorous by plants. Soils deficient in magnesium result in plants losing their green color and in developing slowly or not at all. Such a soil condition occurs in many different sections of the country and on many different crops. The addition of extra magnesium to the soil through the medium of the fertilizer composition of our invention thus tends to minimize or may even eliminate such soil deficiency.

Besides the advantage of my fertilizer composition over those containing organic materials as heretofore mentioned, it is superior to compositions containing as conditioners materials such as sand and spent fuller's earth, since the latter are apt to result in either segregation or, where for example, fuller's earth or other diatomaceous earth is used, the formation of a thick gummy mass which is difficult to handle.

In accordance with one embodiment of my invention the exfoliated vermiculite in the amount of preferably from about 10 to about 30 lbs. per ton of fertilizer, about 0.5 to about 1.5%, is mixed with the ammonium or other nitrogen containing salts, phosphates, and potash. The mixture is then cured until a substantial equilibrium has been reached between the acidic and alkaline components thereof and is then ready for use. In this connection I have found that the use of exfoliated vermiculite in accordance with the present invention substantially minimizes the aforesaid curing period, thereby effecting a saving in additional handling and storage space costs.

By way of further illustration of the said one embodiment of my invention, there are set forth in the following examples typical formulations of fertilizer compositions, in accordance with my invention.

and the like, to condition high analysis fertilizers, such as above set forth, it would be impossible to put in the amount required to do a satisfactory conditioning job. The present invention therefore plays a tremendously important part in facilitating the production of free-flowing, high analysis fertilizers, and the resulting substantial saving to the farmer that such fertilizers effect.

In addition to the foregoing, I have found that if the vermiculite, or at least a portion thereof, be added to the fertilizer after mixing and before bagging, the amount of vermiculite required to render the fertilizer non-caking may be substantially reduced. Specifically, I have found that the addition of up to about 0.8% by weight of vermiculite to commercial fertilizers immediately prior to bagging is adequate to eliminate, or substantially minimize, caking or hardening after bagging and that the addition of such amounts of fertilizer immediately prior to bagging is at least as beneficial as the addition of twice as much vermiculite at the mixing stage.

I have further found that the desirable range

*Example A*

| Materials | Analysis | Pounds | N | Pounds per Ton Available $P_2O_5$ | $K_2O$ |
|---|---|---|---|---|---|
| Nitrogen Solutions (Commercial). | 40.8% N | 345 | 140.76 | | |
| Sulfate of Ammonia | 20.5% N | 290 | 59.45 | | |
| Superphosphate | 20% $P_2O_5$ | 1,000 | | 200 | |
| Muriate of Potash | 60% $K_2O$ | 335 | | | 201 |
| Exfoliated Vermiculite | | 30 | | | |
| Total | | 2,000 | 200.21 | 200 | 201 |
| | | | 10 | 10 | 10 |

*Example B*

| Materials | Analysis | Pounds | N | Pounds per Ton Available $P_2O_5$ | $K_2O$ |
|---|---|---|---|---|---|
| Nitrogen Solution (Commercial). | 40.6% N | 166 | 67.396 | | |
| Sulfate of Ammonia | 20.5% N | 61 | 12.505 | | |
| Superphosphate | 20% $P_2O_5$ | 550 | | 110 | |
| Double Superphosphate | 46% $P_2O_5$ | 804 | | 369.84 | |
| Muriate of Potash | 60% $K_2O$ | 402 | | | 241.20 |
| Exfoliated Vermiculite | | 17 | | | |
| Total | | 2,000 | 79.90 | 479.84 | 241.20 |
| | | | 4 | 24 | 12 |

*Example C*

| Materials | Analysis | Pounds | N | Pounds per Ton Available $P_2O_5$ | $K_2O$ |
|---|---|---|---|---|---|
| Nitrogen Solution (Commercial). | 40.8% N | 207 | 84.45 | | |
| Sulfate of Ammonia | 20.5% N | 174 | 35.67 | | |
| Superphosphate | 20% $P_2O_5$ | 1,200 | | 240 | |
| Muriate of Potash | 60% $K_2O$ | 400 | | | 240 |
| Exfoliated Vermiculite | | 19 | | | |
| Total | | 2,000 | 120.12 | 240 | 240 |
| | | | 6 | 12 | 12 |

It will be noted from the above, that the formulations set forth are of high analysis fertilizers. It is to be noted further that only from about 17 to about 30 lbs. of exfoliated vermiculite sufficed to condition a ton of high analysis fertilizer. In this connection it is seen that if it were attempted to use such materials as rice hulls, tobacco stems of vermiculite addition after mixing and before bagging is from about 0.2 to about 0.8% or from 4 to 16 pounds of vermiculite per ton of commercial fertilizer. In one form or method of the second embodiment of the present invention, the total amount of vermiculite is added to the fertilizer after mixing and prior to bagging. In a second form or method, a portion of the vermiculite may be added to the fertilizer during mixing and the remainder may be added after mixing and prior to bagging.

With respect to the second form or method of the present invention, the addition of a small amount of vermiculite to the fertilizer composition during the mixing or ammoniating of the fertilizer renders the fertilizer substantially non-caking during storage and the addition of a further small amount of vermiculite to the fertilizer composition immediately prior to bagging improves the characteristics of the fertilizer and renders the fertilizer non-caking after bagging. Specifically, I have found that the use of from about 2 to 8 pounds of vermiculite per ton of fertilizer in the mixing stage and the addition of approximately the same amount to the fertilizer composition immediately prior to bagging is at least as beneficial as the addition of from 10 to 30 pounds of vermiculite per ton to the fertilizer composition at the mixing stage. In other words, I have found that approximately one-half the amount of vermiculite is required according to either form or method of the second embodiment of my present invention as is required according to the first embodiment.

In accordance with the said one method of the second embodiment of my invention, exfoliated vermiculite in the amount of preferably from about 4 to about 16 pounds per ton of commercial fertilizer, 0.2 to 0.8% is added to the fertilizer after mixing and prior to bagging. It is preferred that the vermiculite addition be accomplished immediately prior to bagging.

According to the said second method, exfoliated vermiculite in the amount of from about 2 to about 8 pounds per ton of fertilizer, 0.1 to 0.4%, is mixed with commercial fertilizer components. The mixture is then cured until a substantial equilibrium has been reached between the acidic and alkaline components thereof and it is then ready for bagging. In connection with the curing, I have found that the use of exfoliated vermiculite in accordance with the present invention substantially minimizes the aforesaid curing, thereby effecting a saving in additional handling and storage space costs. However, if curing be indulged in, then after curing, exfoliated vermiculite in the amount preferably from about 2 to 8 pounds per ton of fertilizer, 0.1 to 0.4%, is added to or mixed with the cured fertilizer immediately prior to bagging to render the bagged fertilizer non-caking.

By way of further illustration of both methods or forms of the second embodiment of my invention, there are set forth in the following examples typical formulations of fertilizer compositions in accordance with my invention.

*Example D*

| Materials | Analysis | Pounds | N | Pounds Per Ton Available $P_2O_5$ | $K_2O$ |
|---|---|---|---|---|---|
| Nitrogen Solutions (Commercial) | 40.8% N | 345 | 140.76 | | |
| Sulfate of Ammonia | 20.8% N | 295 | 60.48 | | |
| Superphosphate | 20% $P_2O_5$ | 1,010 | | 202 | |
| Muriate of Potash | 60% $K_2O$ | 335 | | | 201 |
| Exfoliated Vermiculite | | 15 | | | |
| Total | | 2,000 | 201.24 | 202 | 201 |
| | | | 10 | 10 | 10 |

*Example E*

| Materials | Analysis | Pounds | N | Pounds Per Ton Available $P_2O_5$ | $K_2O$ |
|---|---|---|---|---|---|
| Nitrogen Solution (Commercial) | 40.6% N | 168 | 68.21 | | |
| Sulfate of Ammonia | 20.5% N | 62 | 12.7 | | |
| Superphosphate | 20% $P_2O_5$ | 550 | | 110 | |
| Double Superphosphate | 46% $P_2O_5$ | 808 | | 371.68 | |
| Muriate of Potash | 60% $K_2O$ | 404 | | | 242.76 |
| Exfoliated Vermiculite | | 8 | | | |
| Total | | 2,000 | 80.92 | 481.68 | 242.76 |
| | | | 4 | 24 | 12 |

*Example F*

| Materials | Analysis | Pounds | N | Pounds Per Ton Available $P_2O_5$ | $K_2O$ |
|---|---|---|---|---|---|
| Nitrogen Solution (Commercial) | 40.8% N | 207 | 84.45 | | |
| Sulfate of Ammonia | 20.5% N | 176 | 36.08 | | |
| Superphosphate | 20% $P_2O_5$ | 1,206 | | 241.2 | |
| Muriate of Potash | 60% $K_2O$ | 402 | | | 241.2 |
| Exfoliated Vermiculite | | 9 | | | |
| Total | | 2,000 | 120.53 | 241.2 | 241.2 |
| | | | 6 | 12 | 12 |

It will be noted from the above, that the formulations set forth are of complete fertilizers. The present invention is not limited in application to the formulation of complete fertilizers, but is equally adapted to the formulation of all commercial fertilizers, both complete, as including nitrogen, phosphorous and potassium, and incomplete, as including some but not all of the three elements recited. Accordingly, it will be appreciated that commercial fertilizers, other than complete fertilizers such as the 10–10–10, 4–24–12 and 6–12–12 formulations set forth, may be formulated according to the present invention, such, for example, as 0–20–20, 0–14–14 and the like. The present invention is also applicable to utilization with fertilizer compositions supplying only one of the enumerated soil nutrients, such as ammonium nitrate.

From the foregoing, it will be appreciated that the present invention provides improved free-flowing, high analysis fertilizers, and improved methods for facilitating the production thereof.

I claim:

1. A free-flowing fertilizer comprising a commercial fertilizer composition in admixture with up to about 1.5% of exfoliated vermiculite.

2. A free-flowing fertilizer comprising a commercial fertilizer composition in admixture with up to about 1.5% of exfoliated vermiculite having a particle size of up to about minus one-eighth inch mesh.

3. A free-flowing fertilizer comprising a commercial fertilizer composition in admixture with from about 0.2% to about 1.5% of exfoliated vermiculite.

4. A method of producing a free-flowing fertilizer which comprises the step of adding up to about 0.8% of exfoliated vermiculite to a commercial fertilizer composition at the time of bagging the mixture.

5. A method of producing a free-flowing fertilizer which comprises the step of adding from about 0.1% to about 0.8% of exfoliated vermiculite to a hygroscopic mixture of salts containing available soil nutrients after mixing the salts and prior to bagging the mixture.

6. A method of producing a free-flowing fertilizer which comprises the steps of mixing from about 0.1% to about 0.4% of exfoliated vermiculite with a hygroscopic mixture of salts containing available soil nutrients, and thereafter, mixing from about 0.1% to about 0.4% of exfoliated vermiculite with the mixture resulting from the first step.

7. A method of producing a free-flowing fertilizer which comprises the steps of first mixing from about 0.1% to about 0.4% of exfoliated vermiculite with a hygroscopic mixture of salts containing available nitrogen, a phosphate, and potassium, and thereafter, mixing from about 0.1% to about 0.4% of exfoliated vermiculite with the mixture resulting from the first step, the second step immediately proceeding bagging of the fertilizer.

8. A method of producing a free-flowing fertilizer comprising the steps of mixing from about 0.1 to about 0.4% of exfoliated vermiculite with a hygroscopic mixture of salts containing available nitrogen, phosphate and potassium, storing the mixture resulting from the first step, and adding from about 0.1 to about 0.4% of exfoliated vermiculite to the stored mixture, the latter step immediately proceeding bagging of the fertilizer.

HARRY A. DRESSER.

References Cited in the file of this patent

UNITED STATES PATENTS

| Number | Name | Date |
| --- | --- | --- |
| 2,008,469 | Prince | July 16, 1935 |
| 2,113,523 | White | Apr. 5, 1938 |
| 2,240,859 | Rice | May 6, 1941 |
| 2,341,800 | Martin et al. | Feb. 15, 1944 |